United States Patent

Prachar

[15] 3,638,501
[45] Feb. 1, 1972

[54] SENSOR

[72] Inventor: Otakar P. Prachar, Santa Barbara, Calif.

[73] Assignee: General Motors Corporation, Detroit, Mich.

[22] Filed: Apr. 27, 1970

[21] Appl. No.: 32,090

[52] U.S. Cl..............................73/492, 200/61.53, 102/78, 185/37
[51] Int. Cl....................................G01p 15/04, H01h 35/14
[58] Field of Search..............73/492, 503; 200/61.53, 61.45; 185/2, 4, 27, 37; 60/7 A, 8; 102/78

[56] References Cited

UNITED STATES PATENTS 2,573,199  10/1951  Holman.......................200/61.45 UX
3,038,973  6/1962  Alpert.................................200/61.45
3,137,175  6/1964  Jamgochian............................73/503
3,337,701  8/1967  Prebilig..............................200/61.45

*Primary Examiner*—Edgar W. Geoghegan
*Attorney*—W. E. Finken and Herbert Furman

[57] ABSTRACT

A bidirectional sensor having an operator mounted within a tubular guide and spring biased in one direction. The operator is constrained against movement by the engagement of a plurality of balls with a shoulder thereof. The balls are held against being cammed outwardly through apertures in the guide by an internal annular wall of a seismic mass. Spring seats extending between spaced annular walls of the mass and a common stop on the sensor housing are engageable by opposing threshold springs.

6 Claims, 2 Drawing Figures

INVENTOR.
Otakar P. Prachar
BY
Herbert Furman
ATTORNEY

SENSOR

This invention relates to sensors, and more particularly to directional sensors for sensing G-loads in a generally horizontal plane and releasing an operator, such as a firing pin, to actuate a mechanism, upon the occurrence of predetermined G-loads for predetermined time pulses.

The sensor of this invention is bidirectional and senses both G-loads and time pulses in opposite axial directions in a horizontal plane. The sensor includes an operator constrained against movement within an elongated guide by a plurality of balls which are axially located by apertures in the guide and which engage both a shoulder of the operator and an internal annular wall of a seismic mass surrounding the guide and movable axially thereof. The distances between the tangential plane of engagement of the balls and the planes of each end of the annular wall provide integrating distances and the seismic mass must move in an axial direction through a respective integrating distance before the operator can force the balls outwardly of the guide apertures so as to be released. The movement of the seismic mass in either axial direction is opposed by a spring-biasing force which has a predetermined threshold value which must be exceeded before the seismic mass can move in the particular axial direction. If the threshold value is exceeded but a predetermined G-load is not reached in a predetermined time pulse, the seismic mass cannot move through an integrating distance to release the balls. The G-loads and time pulses need not be the same in each axial direction of movement.

It is therefore the primary object of this invention to provide a sensor for sensing G-loads and time pulses in opposite axial direction and releasing an operator to actuate a mechanism when predetermined load values for predetermined time pulses are reached.

This and other objects of the invention will be readily apparent from the following specification and drawings wherein.

Figure 1:
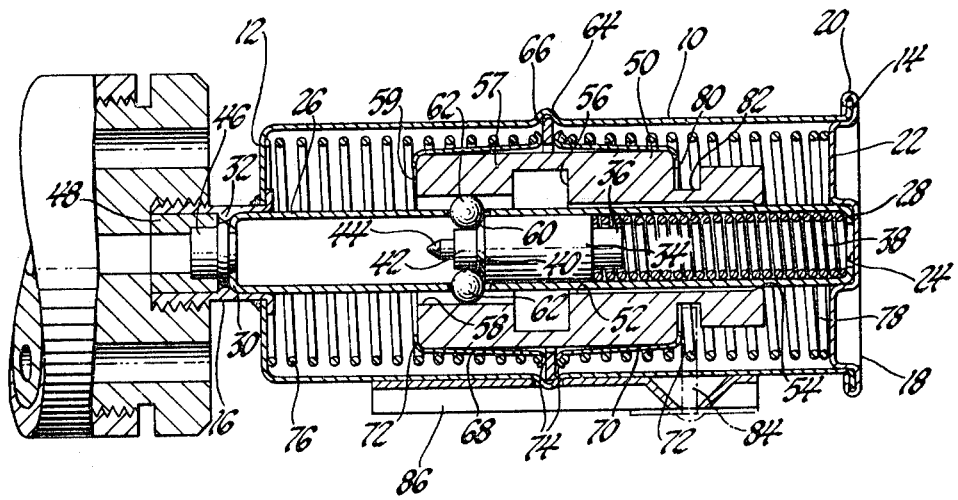
FIG. 1 is a view of the sensor in normal position.

As shown in FIG. 1 of the drawings, the sensor generally includes a support or outer cylindrical housing 10 having an integral apertured end wall 12 and an outwardly extending flange 14. An annular flanged member 16 extends outwardly through the central aperture of wall 12 and has the flange thereof welded or otherwise secured to the wall 12.

A closure cap 18 is hem flanged at 20 to flange 14 and includes a continuous, circular, depressed rib 22 which defines a hollow bore 24 in the cap aligned with the bore of the member 16. Cap 18 may also be secured to flange 14 by a releasable connection, such as a bayonet-type slot structure.

A tubular guide 26 of cylindrical cross section has one flanged end wall 28 received within bore 24 and the other flanged end wall 30 received within the bore of member 16 in engagement with an integral internal annular rib 32 of the member 16. An operator 34, which is shown in the form of a firing pin, is slidably mounted within the guide 26. One end of the operator includes a reduced diameter annular extension 36. A coil compression spring 38 seats between the inwardly flanged end wall 28 of guide 26 and the one end of the operator to exert a continuous bias on the operator and urge it to the left as viewed in FIGS. 1 and 2. The operator further includes a radially outwardly tapered wall or annular shoulder 40 which merges into an annular extension providing an axially extending annular wall 42. A pointed pin 44 extends axially of the extension 42 and provides the firing pin.

When the operator 34 is released, as will be hereinafter described, the spring 38 moves the firing pin to the left, from its position shown in FIG. 1, to its position shown in FIG. 2. In this position, the pin 44 engages a detonator 46 within member 16 to explode or fire the detonator. The firing of the detonator can ignite other means, such as a pyrocord, or rupture a seal such as a diaphragm, to accomplish various purposes. The detonator 46 is conventionally held against the inwardly flanged end wall 30 of guide 26 by a plug 48 or by any other suitable arrangement.

An annular seismic mass or weight member 50 surrounds the guide 30. The weight member includes an internal annular wall or bore 52 which is slightly spaced from the outer surface of the guide 26 and includes an internal radially inwardly extending rib 54 which engages the outer surface of the guide to slidably support the one end of the weight member on the guide for movement axially thereof. The weight member further includes an internal annular groove 56 of generally rectangular cross section which opens to bore 52 and an internal annular wall 58 which is spaced a predetermined distance from the outer surface of the guide. Wall 58 thus terminates or is bounded by two generally radially extending end walls, one being the left-hand radial wall 57 of groove 56 and the other being the left-hand end wall 59 of the weight member.

The guide 26 includes a plurality, preferably three, equally circumferentially spaced, circular openings or apertures 60 through the wall thereof. A ball 62 is freely received within each aperture and engages wall 58 and both shoulder 40 and wall 42. The balls 62 are thus held against radial movement by walls 58 and 42, and the engagement of the balls with the shoulder 40 provides a detent locating the operator 34 in its position shown in FIG. 1 against the bias of the spring 38. The balls further slidably support the other end of the weight member 50 on guide 26. As will be further described in detail, the operator 34 will be normally maintained in this position against any movement until such time as the weight member 50 has moved axially in either direction a sufficient distance relative to the guide 26 so as to move the wall 58 out of opposition to the balls and permit the shoulder 40 to cam the balls outwardly of the opening 60. The tapering of the shoulder 40 aids this camming action.

The weight member 50 is normally maintained in its position as shown in FIG. 1 by cooperating stops on the weight member and housing 10 by opposing coil compression springs as will now be described. The housing 10 includes an outwardly extending integral annular rib 64 which receives and locates an internal annular continuous or split ring 66. Rib 64 is located generally intermediate wall 12 and flange 14 of the housing. A pair of like annular spring seats 68 and 70 surround the weight member 50, each spring seat including a radially inwardly extending annular flange 72 and a generally radially outwardly extending return bent annular flange 74. The spring seats 68 and 70 are slightly flared or tapered to decrease the area of engagement between the spring seats and the weight member to a minimum, as will be further described. Coil springs 76 and 78 are respective to the spring seats 68 and 70. Spring 76 seats on wall 12 and flange 74 of seat 68 to hold flange 74 in engagement with ring 66 opposite the like flange of seat 70. Flange 72 of seat 68 engages the left-hand radial end wall 59 of the weight member to locate the weight member against axial movement to the left. Spring 78 seats on the rib 22 of cap 18 and on flange 74 of seat 70 to thereby hold flange 74 of seat 70 in engagement with ring 66. Flange 72 of seat 70 engages a radial wall 80 of member 50 to locate the weight member against axial movement to the right. Thus the weight member is normally located as shown in FIG. 1 with the balls 62 located approximately midway between the radial end walls bounding the wall 58.

The sensor of this invention has particular usefulness in an air cushion restraint system. Such system may include a sealed pressure vessel containing pressure fluid, such as air, nitrogen or carbon dioxide, or such fluid as well as a charge of explosive powder. Normally the vessel is sealed by a rupturable seal and connected to a manifold which communicates the vessel with an inflatable cushion. The sensor of this invention senses predetermined G-loads in either direction along the axis thereof and then releases the operator 34 to either directly or explosively rupture the diaphragm and release the pressure fluid. Alternatively, the operator 34 may electrically or explosively ignite the charge of explosive powder in the vessel so that the increased volume and pressure of this charge and the pressure fluid ruptures the seal of the vessel and inflates the cushion.

Referring now to FIG. 1, it can be seen that the weight member 50 can move through a predetermined distance in either axial direction without releasing the balls 62. This distance is determined by the axial distance between the radial plane containing the tangential points of engagement of the balls 62 and either the plane containing wall 57 or wall 59. This distance may be called the integrating distance.

The springs 76 and 78 may be called threshold springs. Each spring exerts sufficient force on a respective seat 68 and 70 so that it will take a pulse of from 2 to 3 G's before the seismic mass or weight member 50 can start to move axially against the opposing bias force of a respective threshold spring.

The weight of the member 50, the integrating distances, and the force of the threshold springs may be set as desired so that the balls 62 will not be released unless a predetermined G-load for a predetermined time pulse is reached in each axial direction. In the specific embodiment shown, the weight member 50 must receive a G-load of approximately 8 G's for 10 msec. before the weight member will move in either axial direction through an integrating distance to release the balls 62 and thereby permit the spring 38 to move the operator 34 to the left.

While the integrating distances are equal in the embodiment shown, it is believed clear that the sensor can be calibrated so that it will take a greater G-load in one axial direction than in the opposite axial direction over either a longer or a shorter time period before the balls 62 will be released to in turn release the operator 34. Likewise the forces applied by the springs 76 and 78 may be equal or varied as desired.

While it is believed that the operation of the sensor is clear from the foregoing, a brief description of the operation will now be provided with reference to the drawings. Assume that the weight member 50 receives a pulse of 8 G's for 10 msec. in a left-hand direction, the weight member 50 will move axially of the guide 26 in this direction from its position shown in FIG. 1 to its position shown in FIG. 2. During this movement, the rib 54 of the weight member and the balls 62 support the weight member on the guide. As soon as the weight member 50 has moved through the integrating distance between the plane containing the tangential points of engagement of the balls 62 and the plane containing wall 57, the shoulder 40 of the operator 34 will force the balls 62 outwardly along the wall 57 and within the groove 56 as shown in FIG. 2 under the action of the spring 38 to thereby release the operator 34. Should the pulse be in a right-hand direction for the same period of time, the weight member 50 will, of course, move in this direction through the integrating distance between the plane containing the tangential points of engagement of the balls 62 and the plane containing wall 59 so that the shoulder 40 can again force the balls 62 outwardly along wall 59.

Should the G-loads be below the predetermined value but above the threshold value of either spring 76 or 78, and should the time pulses be less than the predetermined value, the weight member 50 will, of course, move axially relative to the balls 62 but the balls will not be released since the wall 58 will be maintained in engagement therewith. Upon cessation of such G-loads or reduction thereof below the threshold value of the opposing spring, such spring returns the weight member 50 to its position shown in FIG. 1. The opposing spring, of course overcomes the frictional restraint of the balls on the wall 58 of the weight member 50.

Figure 2:
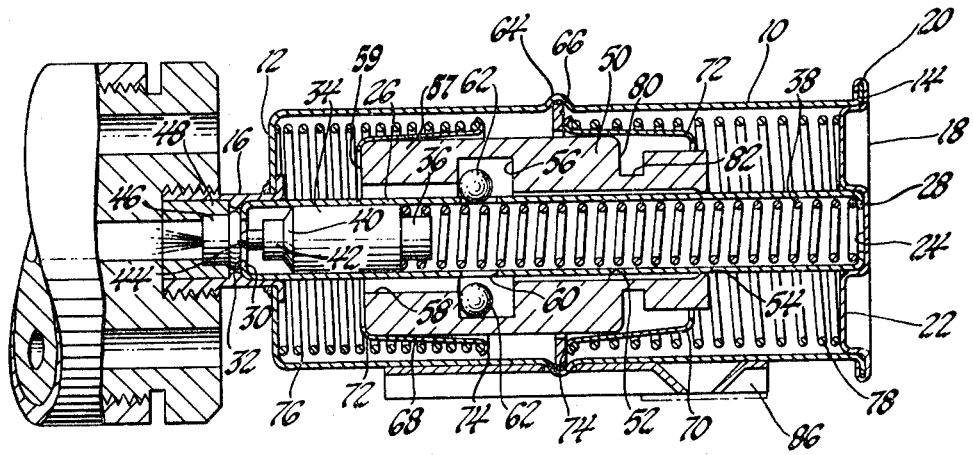
FIG. 2 is a view of the sensor in actuated position.

It will also be noted with reference to FIGS. 1 and 2 that the G-load applied to the weight 50 need only overcome the opposing force of one of the springs 76 or 78 inasmuch as the weight member 50 moves out of engagement with the seat of the other spring. Thus, if the pulse is to the left as shown in FIG. 2, the wall 80 of the weight member moves out of engagement with the flange 72 of seat 70 as the weight member moves against the opposing bias of spring 76. Spring 78, of course, is ineffective to apply any force to the weight member 50 to move it to the left or to the right. If the pulse load is to the right, the reverse, of course, will be true.

The wall 80 forms one of the side walls of a circumferential annular groove 82 in the weight member 50 and this groove may receive a safety pin indicated schematically at 84 which extends upwardly through an aperture in the mounting bracket 86 of the sensor to immobilize the sensor when desired.

Thus, this invention provides an improved bidirectional sensor.

I claim:

1. A bidirectional sensor comprising, in combination, a support, a generally tubular linear guide having a plurality of circumferentially spaced radial apertures therethrough, an elongated annular member of predetermined weight surrounding the guide, means adjacent one end of the weight member slidably engaging the guide, means exerting predetermined opposite axial resilient biases, cooperating pairs of stop means on the weight member and support engageable with each other and a respective bias to locate the weight member in a predetermined axial position with respect to the guide, a predetermined G-load on the weight member moving the weight member axially of the guide and overcoming one of the predetermined biases, the weight member including an annular wall of predetermined axial extent adjacent the other end thereof overlying the guide apertures, an operator slidably mounted within the guide and having a generally radially extending annular shoulder, resilient means biasing the operator axially within the guide, a plurality of balls, each respective to an aperture of the guide and freely received therein, the balls being engageable with the weight member wall and operator shoulder, the balls slidably mounting the other end of the weight member on the guide, the weight member wall holding the balls against movement out of engagement with the operator radial shoulder under the action of the resilient means to block axial movement of the operator, the weight member wall being movable axially of and out of engagement with the balls upon a predetermined extent of axial movement of the weight member in either axial direction to permit the operator radial shoulder under the action of the resilient means to move the balls outwardly of the guide apertures and out of engagement therewith.

2. A bidirectional sensor comprising, in combination, an annular support, a generally tubular linear guide extending axially of the support and having a plurality of circumferentially spaced radial apertures therethrough, a hollow annular seismic mass member of predetermined weight surrounding the guide and having an internal annular rib slidably engaging the guide, bias means exerting opposite axial predetermined forces, stop means on the support, cooperating stop means on the mass member respective to each bias means and engageable with the support stop means under a respective bias to locate the mass member in a predetermined axial position with respect to the guide, a predetermined G-load on the mass member in an axial direction overcoming the opposing force of one of the bias means and moving the mass member in the one axial direction relative to the guide, the mass member including an internal annular wall of predetermined axial extent overlying the guide apertures in the predetermined axial position and terminating in radially outwardly extending end walls, an operator slidably mounted within the guide and having a radially extending annular shoulder, resilient means biasing the operator in one axial direction within the guide, a plurality of balls, each respective to an aperture of the guide and freely received therein, the balls being engageable with the annular shoulder and with the mass member wall intermediate the end walls thereof to locate the balls within the guide and to block movement of the operator in the one axial direction, the internal annular rib engaging the guide and the balls engaging the internal annular wall slidably supporting the mass member for movement axially of the guide, the mass member internal wall being movable axially of and but of engagement with the balls upon movement of the weight member through the axial distance between the line of tangency of the balls and one end wall to permit the operator shoulder to move the balls outwardly of the guide apertures along the one end wall and out of engagement therewith and release the operator.

3. A bidirectional sensor comprising, in combination, a support, stop means on the support, a generally tubular linear guide having a plurality of circumferentially spaced radial apertures therethrough, an annular seismic mass member of predetermined weight surrounding the guide and having spaced radial walls, means on the mass member slidably engaging the guide, stop means on the support, axially spaced annular seat means surrounding the mass member, each seat means engaging the stop means to locate one seat means against movement in one axial direction and permit movement in the other axial direction and to locate the other seat means against movement in the other axial direction and permit movement in the one axial direction, each seat means engaging a respective radial wall of the mass member for movement therewith in a permitted axial direction and independent movement of the mass member relative thereto in an axial direction opposite the permitted direction, means exerting a predetermined bias on each seat means to resist movement of each seat means and mass member as a unit in a permitted axial direction, a predetermined G-load on the mass member in a permitted axial direction moving the mass member and one of the seat means axially of the guide and overcoming one of the predetermined biases, the mass member including an annular wall of predetermined axial extent overlying the guide apertures, an operator slidably mounted within the guide and having an annular shoulder, resilient means biasing the operator axially within the guide, a plurality of balls, each respective to an aperture of the guide and freely received therein, the balls being engageable with the mass member internal wall to locate the balls within the guide and in engagement with the operator shoulder to block axial movement of the operator, the mass member wall being movable axially of and out of engagement with the balls upon a predetermined extent of axial movement of the weight member to permit the operator shoulder to move the balls outwardly of the guide apertures and out of engagement therewith.

4. A bidirectional sensor comprising, in combination, a support, stop means on the support, a generally tubular linear guide having a plurality of circumferentially spaced radial apertures therethrough, an annular seismic mass member of predetermined weight surrounding the guide and having spaced radial walls, means on the mass member slidably engaging the guide, axially spaced annular seat means surrounding the mass member, one edge portion of each seat means engaging the stop means to locate one seat means against movement in one axial direction and permit movement in the other axial direction and to locate the other seat means against movement in the other axial direction and permit movement in the one axial direction, each seat means engaging a respective radial wall of the mass member for movement therewith in a permitted axial direction and independent movement of the mass member relative thereto in an axial direction opposite the permitted direction, means exerting a predetermined bias on each seat means to resist movement of each seat means and mass member as a unit in a permitted axial direction, a predetermined G-load on the mass member in a permitted axial direction moving the mass member and one of the seat means axially of the guide and overcoming one of the predetermined biases, the mass member including an internal annular wall of predetermined axial extent overlying the guide apertures and bounded by one of the radial walls engaged by a seat means and an axially spaced other radial wall, an operator slidably mounted within the guide and having an annular shoulder, resilient means biasing the operator axially within the guide, a plurality of balls, each respective to an aperture of the guide and freely received therein, the balls being engageable with the mass member internal wall to locate the balls within the guide and in engagement with the operator shoulder to block axial movement of the operator, the mass member internal wall being movable axially of and out of engagement with the balls upon a predetermined extent of axial movement of the weight member to permit the operator shoulder to move the balls outwardly of the guide apertures along one of the radial walls bounding the internal wall to free the operator.

5. A sensor comprising, in combination, a support, stop means on the support, a generally tubular linear guide having a plurality of circumferentially spaced radial apertures therethrough, an annular seismic mass member of predetermined weight surrounding the guide and having spaced radial walls, means on the mass member slidably engaging the guide, a pair of annular flared seats surrounding the mass member, each having oppositely extending radial end flanges, one flange of each seat engaging the stop means to locate one seat against movement in one axial direction and permit movement in the other axial direction and to locate the other seat against movement in the other axial direction and permit movement in the one axial direction, the other flange of each seat engaging a respective radial wall of the mass member for movement therewith in a permitted axial direction and independent movement of the mass member relative thereto in an axial direction opposite the permitted direction, the seats flaring outwardly in an axial direction opposite the permitted direction thereof to readily permit independent movement of the mass member relative thereto, means exerting a predetermined bias on the other flange of each seat to resist movement of each seat and mass member as a unit in a permitted axial direction, a predetermined G-load on the mass member in a permitted axial direction moving the weight member and one of the seats axially of the guide and overcoming one of the predetermined biases, the mass member including an annular wall of predetermined axial extent overlying the guide apertures, an operator slidably mounted within the guide and having an annular shoulder, resilient means biasing the operator axially within the guide, a plurality of balls, each respective to an aperture of the guide and freely received therein, the balls being engageable with the mass member wall to locate the balls within the guide and in engagement with the operator shoulder to block axial movement of the operator, the mass member wall being movable axially of and out of engagement with the balls upon a predetermined extent of axial movement of the mass member to permit the operator shoulder to move the balls outwardly of the guide apertures and out of engagement therewith.

6. A sensor comprising, in combination, a support, a generally tubular linear guide having a plurality of circumferentially spaced radial apertures therethrough, an elongated annular member of predetermined weight surrounding the guide, means adjacent one end of the weight member slidably engaging the guide, the weight member including an annular wall of predetermined axial extent adjacent the other end thereof overlying the guide apertures, an operator slidably mounted within the guide and having a generally radially extending annular shoulder, resilient means biasing the operator in one axial direction within the guide, a plurality of balls, each respective to an aperture of the guide and freely received therein, the balls being engageable with the weight member wall and the operator shoulder, the balls slidably mounting the other end of the weight member on the guide, the weight member wall holding the balls against movement out of engagement with the operator radial shoulder under the action of the resilient means to block axial movement of the operator, means exerting a bias on the weight member in the one axial direction, means locating the weight member against the action of the bias thereon in a predetermined position axially of the guide to locate the balls in a predetermined position axially of the extent of the weight member wall, the weight member wall being movable axially of and out of engagement with the balls upon a predetermined extent of axial movement of the weight member in the opposite axial direction against the bias thereon to permit the operator radial shoulder under the action of the resilient means to move the balls outwardly of the guide apertures and out of engagement therewith and release the operator for movement in the one axial direction.